June 2, 1959  Y. E. LEBEDEFF ET AL  2,889,196
REMOVAL OF GERMANIUM VALUES FROM COPPER-BEARING
MATERIALS CONTAINING SAME
Filed Sept. 21, 1954  2 Sheets-Sheet 1

INVENTOR.
YURII E. LEBEDEFF
WILLIAM H. WETHERILL
BY E. J. Schaffer
ATTORNEY

›
United States Patent Office 2,889,196
Patented June 2, 1959

2,889,196

REMOVAL OF GERMANIUM VALUES FROM COPPER-BEARING MATERIALS CONTAINING SAME

Yurii E. Lebedeff, Metuchen, N.J., and William Henry Wetherill, Tottenville, N.Y., assignors to American Smelting and Refining Company, New York, N.Y., a corporation of New Jersey Application September 21, 1954, Serial No. 457,332

4 Claims. (Cl. 23—17)

This invention relates to the removal of germanium values from copper-bearing materials and more particularly to the removal of these values contained in such material obtained by cementation in the purification of zinc plant electrolytes.

Zinc ores are an important source of copper-bearing material containing germanium values. Thus, in the electrolytic process of recovering zinc, these ores are usually concentrated, roasted and the roasted concentrate is acid leached to form a zinc electrolyte containing the soluble copper and germanium values as well as other impurities contained in the leached material. The dissolved zinc is recovered from the leach solution by electrolysis; however, prior to the electrolysis, the solution is purified by a process involving a cementation procedure in which metallic zinc is generally used as the galvanic precipitant. The resulting sponge precipitant contains substantially all or a large portion of the copper and germanium values originally present in the ore. The mineral germanite and similar minerals are another source of the copper-bearing materials. In addition to copper and germanium, the copper-bearing materials with which the invention is concerned usually contain arsenic or zinc or both of these constituents. Other constituents of no particular importance to the invention may also be present in the material to be treated.

Heretofore there has been no satisfactory pyrometallurgical procedure available for removing germanium values from copper-bearing materials. The principal object and advantage of the invention is that it provides a method of this type for removing these values from such materials. Practice of the invention also results in a concentration of the germanium values; this being a particularly important advantage as the germanium content of the copper-bearing material is generally low. In addition, the invention affords a means of separating copper from the germanium and at least partially separating arsenic and germanium therefrom. These and other objects and advantages will become apparent from the following more detailed description of the invention.

Broadly the invention comprehends removing germanium values from copper-bearing material by smelting such material in the presence of at least a sufficient amount of sulfur to form a melt of molten matter substantially without the formation of metal or speiss layers in the melt. The melt is maintained in a molten condition to volatize the germanium values therefrom as a fume after which said values are recivered from the fume.

The broad invention is based upon the discovery that at or substantially at equilibrium conditions in the melt the germanium content in the matte and slag layers, if any of the latter is formed, is very low, i.e., in the range of about 0.017–0.042% in the matte layer and about 0.02–0.1% in the slag layer. On the other hand speiss or metal layers, if allowed to form in the melt because of the absence of a sufficient amount of sulfur, retain a high content of germanium in the range of about 0.76 to 1.10% Ge. It will be understood that the copper taken into the matte and slag is bound thereby and substantially none of it is carried over during the fuming of the germanium values from the melt.

The smelting may be conducted in an open smelting zone, for example in a reverberatory furnace where the melt is exposed to the products of combustion or the process may be conducted in an enclosed smelting zone such as in a crucible furnace. The sulfur required to form the specified matte, which is a sulfide matte, may be present or added to the material to be smelted or it may be formed in situ in the melt. The amount of sulfur required will depend upon the nature and the amount of the constituents present in the starting material, particularly the copper, zinc, arsenic and germanium. Although the copper-bearing material with which the invention is concerned may contain sulfidic sulfur or sulfur values which may be converted thereto, such materials are usually deficient in sulfur and it is preferred to mix elemental sulfur therewith to practice the invention.

In conducting the process in an enclosed zone, with increasing amounts of sulfur added to the starting material it was found that germanium elimination from the melt increased rapidly as the amount of sulfur was increased up to the point where substantially no formation of metal or speiss layers took place in the melt. This point occurred with an amount of sulfur in the charge which was about 5% less, by weight of the charge, than the minimum amount of sulfur required to form no metal or speiss layers in the melt. Thereafter, germanium elimination increased at a sharply lower rate with increased amounts of sulfur up to about an additional 5% by weight of the charge at which point no metal or speiss layers were formed. With higher amounts of sulfur, elimination of the germanium values increases at an even lower rate reaching for all practical purposes a maximum when the copper-bearing material is smelted in the presence of about 10% sulfur above that required to smelt the charge without the formation of metal or speiss layers. Formation of a slag layer is dependent upon the presence of slag forming constituents in the starting material or the addition of fluxes to the melt which may be desirable to control the melting of the material. Slag formation does not appear to be dependent upon the added sulfur.

It has been found further that zinc, when it is present in the material to be smelted, is eliminated from the melt at a high rate as the amount of sulfur present in the starting material is increased up to an amount which is about 5–0% less, by weight of the charge, than the minimum amount of sulfur required to form no metal or speiss layers in the melt. Thereafter, as the amount of sulfur is further increased the zinc elimination decreases sharply for amounts of sulfur up to about 10% above the aforesaid minimum amount of sulfur. On the other hand, the shape of the curves of arsenic elimination versus amount of sulfur present in the material to be smelted is similar in shape to those of germanium elimination. The percentage elimination of arsenic however is well below that of germanium with amounts of sulfur which are about 5%, by weight of the charge, below the minimum amount of sulfur required to form no metal or speiss layers. Thereafter the arsenic elimination rises more steeply up to the said minimum amount of sulfur and about this minimum the percentage elimination of arsenic approaches that of germanium.

In a narrower aspect of the invention, advantage is taken of the foregoing phenomena with respect to germanium, arsenic and zinc elimination not only to effect removal of germanium from copper-bearing material but also to separate or concentrate the germanium with respect to arsenic or zinc which may be present in the starting material. To effect such concentration or separation, the sulfur used in smelting is controlled within critical limits. Thus to remove germanium from the copper-bearing material and to concentrate or separate it with respect to zinc, sulfur is added to the material to be smelted in amounts in the range of about 5% less to about 10% more, by weight of the charge, than the minimum amount of sulfur required to avoid formation of metal or speiss layers. To remove the germanium and to concentrate or separate it with respect to arsenic, or with respect to both arsenic and zinc in one smelting step, the upper limit of the sulfur range is restricted to the minimum amount of sulfur required to avoid the metal or speiss layers. For best results this minimum amount of sulfur is preferred whether or not arsenic or zinc are present in the copper-bearing material. As is well known in the copper smelting art, the minimum amount of sulfur required to avoid formation of metal and speiss layers can be readily determined from an analysis of the copper-bearing starting material by calculating the amount of sulfur required to convert the metal values in the starting material to sulfides.

It will be understood that when the process is conducted in an open smelting zone, sulfur may be lost. Accordingly additional sulfur, as dictated by experience, may be required in order to maintain the presence of sulfur in the foregoing ranges. It will be understood also that the process may be practiced in a plurality of smelting steps. Thus for example the copper-bearing material may be smelted to remove the germanium and to effect maximum separation of zinc after which the removed germanium values may be mixed with copper and resmelted to again remove the germanium and effect maximum arsenic separation.

In practicing the process in an enclosed smelting zone improved results are obtained in recovering the germanium values in the fume by sweeping the evolved fume from the smelting zone with a stream of gas which preferably is air. The recovery is further improved by maintaining the volume of the sweeping gas at minimum; for example, just sufficient to remove the evolved fume from the smelting zone. The use of a minimum sweeping stream is also preferred when open zone smelting is practiced.

It has also been found that recovery of the germanium values in the fume is improved by burning the fume with air or an oxygen containing gas. Such burning is preferably accomplished in a zone separate from the smelting zone. Best results are obtained by the use of a minimum sweeping stream together with burning of the fume, especially when the material to be treated is smelted with an amount of sulfur in excess of the minimum amount required to avoid metal or speiss layers in the melt and particularly when bags are used to filter the resulting fume.

The invention will be further illustrated in the following examples and in the accompanying drawings. It should be understood, however, that the examples and the drawings are presented for purposes of illustration and invention in the broader aspects is not limited thereto.

Figure 1:
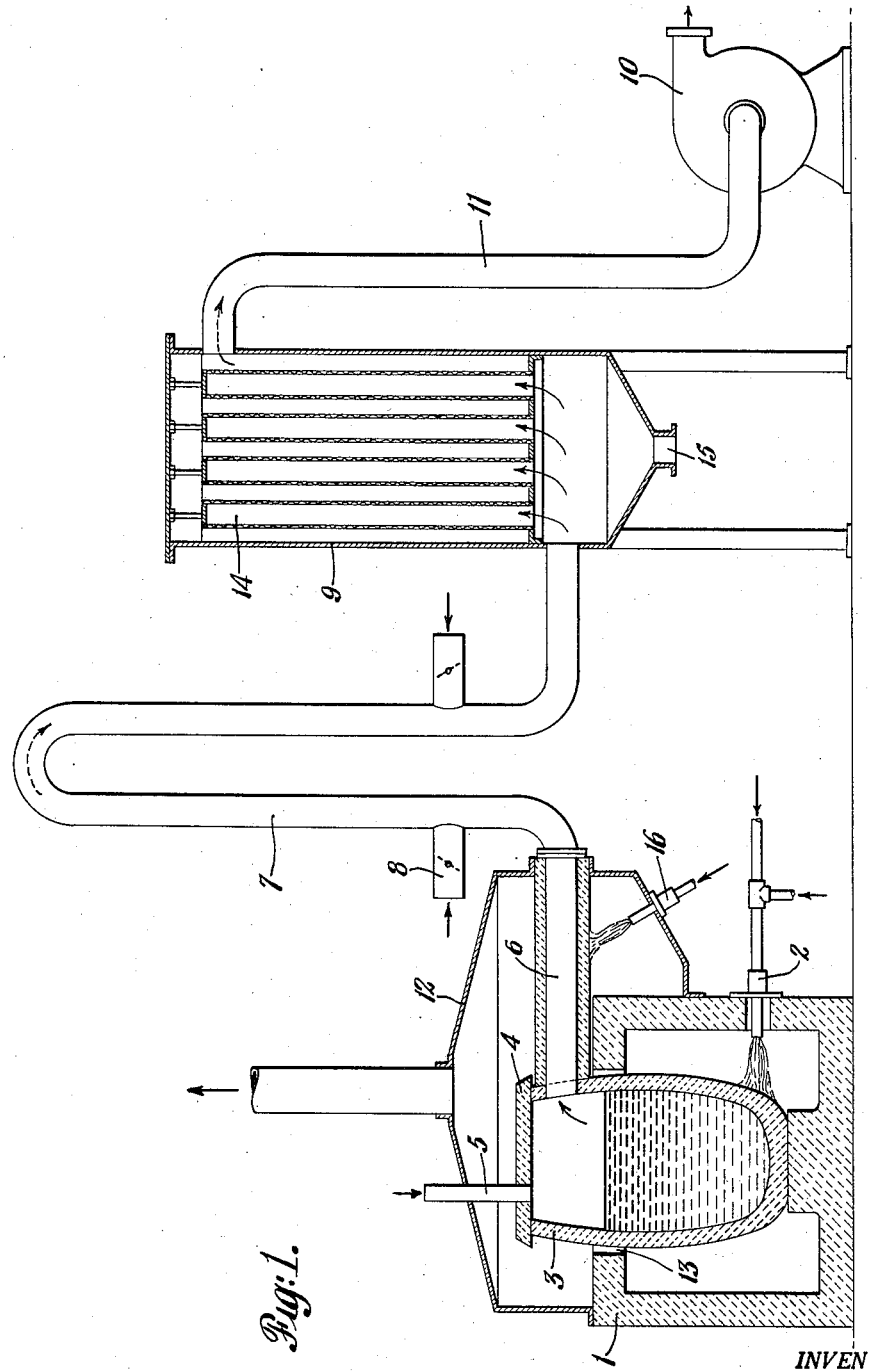
Fig. 1 is a drawing, diagrammatic in fashion, of preferred apparatus for the practice of the process of the invention.

Referring now to Fig. 1, the numeral 1 represents a furnace provided with a suitable fuel burner 2. Disposed in the furnace is crucible 3 which is provided with cover 4 and which is also provided with air inlet conduit 5 and fume take-off conduit 6. Conduit 6 leads to a radiant cooler 7 having opening 8 for admitting additional air. The cooler 7 is connected to bag house 9 which in turn is connected to exhaust fan 10 by means of conduit 11.

In operation, a mixture of the copper-bearing material and sulfur are charged to crucible 3. The cover 4, air conduit 5 and removable furnace roof 12 are then placed in the position shown in Fig. 1. With the smelting zone within the crucible thus enclosed the burner 2 is started; the hot products of combustion enveloping the portion of the crucible within the furnace and escaping through the annular space 13 thereby also heating the upper portion of the crucible and a portion of the conduit 6. In smelting the charge, it is heated to form a molten melt and the melt is maintained in the molten condition to fume-off the desired amount of the germanium values. Generally little or no fume is formed during the period in which the charge is being melted, thereafter fume is evolved at a rate and in an amount dependent upon the constituents and their concentration in the charge. Preferably in conducting the smelting the charge is maintained molten until substantially all fuming has ceased at which time substantially all of the germanium values are removed from the matte and slag in the melt.

The fan 10 preferably is started with the burner 2 although it may be started at any time before the charge becomes molten or evolution of fume begins. The evolved fume, together with the sweeping gas entering inlet 5, is drawn through cooler 7 where it is mixed with an excess of air introduced through inlet ports 8 to assure that the combustion referred to hereinafter is complete. In passing through the cooler the fume is cooled and condensed to convert it to a solid suspended in a gas and also to cool the gaseous suspension to a temperature suitable for filtration in the bag house 9 without injuring the bags. The suspended solids are filtered from the gas stream by the bags 14 and are recovered through hopper outlet 15. The clean gas which is drawn from the bag house 9 through the conduit 11 may be exhausted to atmosphere.

For best results in subsequent handling as well as ease of filtration especially with bag filters the fume products recovered in the bag house should be relatively dense. It has been found that a dense fume is formed by burning the evolved fume with air, preferably in a separate burning zone, thereby converting the fume constituent to oxides. The use of a minimum volume of sweeping gas has also been found to assist in the recovery of a dense fume product. In the preferred mode of operation both of these steps are practiced. Thus, the size of opening 5 or the speed of fan 10 or both are controlled to provide a stream of air which is sufficient to sweep the evolved fume from the smelting zone in crucible 3, and in addition burner 16 is provided to maintain the conduit 6 at a temperature sufficient to support combustion of the fume.

After the removal of the germanium values, the residual molten melt may be removed from crucible 3, either as such or after it has solidified, and may be further processed to recover metal values therein. The fume product may be subjected to additional treatment to further concentrate and purify the germanium values therein, for example, by chloride distillation in a manner well known in the art. Instead of the closed zone illustrated in Fig. 1, the smelting may be conducted in an open zone for example in a reverbatory furnace. Also electrical precipitation may be practiced in place of or in conjunction with the bag filter. Likewise, any other suitable cooling apparatus instead of the radiant cooler 7 may be used. With any such alternative apparatus or with apparatus of the type illustrated in Fig. 1, any one or more of the steps of sweeping the evolved fume from the smelting zone, burning the evolved fume and exhausting the system may be dispensed with. If desired the process may be operated merely with a smelting furnace, a fume cooler, and fume collecting apparatus.

EXAMPLES

Samples of copper sponge having the following typical analysis were smelted in apparatus as shown in Fig. 1 using a graphite crucible. The sponge was the precipitate obtained in the purification of electrolytic zinc plant electrolyte by cementation of the impurities from the electrolyte with metallic zinc.

| Element | Sample 1 | Sample 2 |
|---|---|---|
| | Percent | Percent |
| Cu | 43.1 | 46.5 |
| Zn | 12.2 | 10.0 |
| Pb | 5.6 | 8.2 |
| As | 1.81 | 1.68 |
| Ge | 0.61 | 0.66 |
| S | | 2.13 |

In each of the examples set forth in Table I, the sample and amount thereof were mixed with the indicated amount of sulfur all of which was fine enough to pass through a standard six mesh screen. The cover 4 was then cemented in position and the burners 2 and 16 and the fan 10 were started. A total of two hours were taken to melt the charge and establish in it a preferred temperature in the range of about 2100-2300° F. Very little fume was evolved during the first hour and a half of this initial heating. Thereafter the temperature of the melt was maintained in the indicated range for a further period of five hours. At the end of the five hour period very little, if any, fume was being evolved. The stream of sweeping air entering inlet port 5 was maintained at a minimum value sufficient to sweep the evolved fume from the crucible 3. The burner 16 was fired at a rate to maintain a temperature of about 1100° F. in the conduit 6 which was sufficient to support combustion of the fume. Sufficient air was admitted through the port 8 to assure the presence of excess air to complete the combustion of the fume.

After the five hour period, the residual charge was slowly cooled and solidified. This solid charge was removed from the crucible and the matte, slag, metal or speiss layers, where the latter three phases occurred, were separated. The evolved fume separated in the bag house and any that separated in the cooling flues was collected. The weight and analysis of the fume and the various phases of the residual charge were determined. From these data the eliminating of the germanium, arsenic and zinc from the charge were determined. The results are set forth in Table I.

*Table I*

| Example | Sample No. | Charge | | Slag | |
|---|---|---|---|---|---|
| | | Weight Residue, lb. | Sulfur Addition, percent | Weight, lb. | Percent Ge |
| 1 | 1 | 12 | 33 | None | |
| 2 | 2 | 15 | 25 | 1.4 | 0.02 |
| 3 | 2 | 15 | 20 | 1.0 | 0.08 |
| 4 | 2 | 15 | 15 | 1.20 | 0.11 |
| 5 | 2 | 15 | 10 | 1.0 | 0.033 |
| 6 | 2 | 15 | None | 0.85 | 0.047 |

| Example | Matte | | Speiss or Metal | | Fume, Percent Ge, lb. | Percent Elimination in the Fume | | |
|---|---|---|---|---|---|---|---|---|
| | Weight, lb. | Percent Ge | Weight, lb. | Percent Ge | | Ge | As | Zn |
| 1 | 9.0 | 0.02 | None | | 1.02 | 7.0 | 97 | 90 | 15 |
| 2 | 10.4 | 0.045 | None | | 1.50 | 5.7 | 95 | 73 | 30 |
| 3 | 9.3 | 0.017 | 0.95 | 1.10 | 1.35 | 6.6 | 87 | 16 | 50 |
| 4 | 6.1 | 0.018 | 3.20 | 0.96 | 1.80 | 3.9 | 65 | 13 | 76 |
| 5 | 2.0 | 0.017 | 6.75 | 0.76 | 1.65 | 2.9 | 47 | 9 | 76 |
| 6 | 1.2 | 0.025 | 6.90 | 0.96 | 1.95 | 1.9 | 35 | 9 | 79 |

It will be noted that substantially no formation of metal or speiss took place when 20% sulfur, by weight of the charge, was added to the copper-bearing material and with sulfur in amounts of 25% and more, by weight of the charge, only matte or only matte and slag layers were formed.

Figure 2:
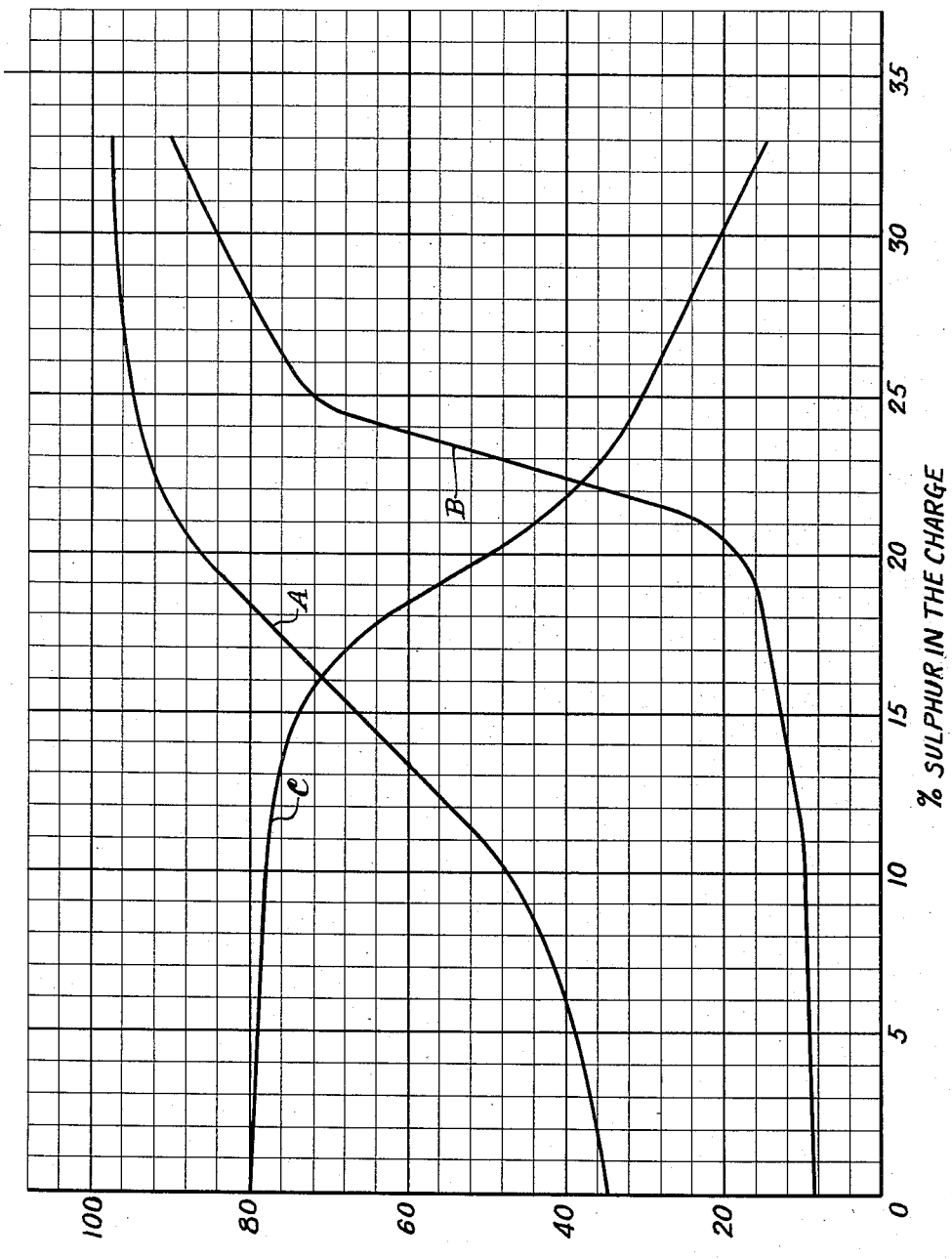
Fig. 2 shows a series of curves illustrating removal of germanium, arsenic and zinc values from copper-bearing materials versus percentage of sulfur added to the materials to be smelted.

The curves shown in Fig. 2 were obtained from the data set forth in Table I. Curves "A," "B" and "C" are a plot of percentage sulfur added to the copper-bearing material versus percentage elimination of germanium, arzenic and zinc respectively.

It will be noted from curve "A" that as the added sulfur is increased the elimination of germanium increases rapidly up to about 20% sulfur, by weight of the charge, the rate of increase then decreases sharply up to about 25% sulfur, by weight of the charge, after which this rate further decreases reaching for all practical purposes a maximum of about 97% germanium elimination with 35% S, by weight of the charge. In accordance with curve "B," arsenic elimination proceeds at a substantially constant low rate up to about 20% sulfur, by weight of the charge. The percentage of arsenic removed increases sharply between 20-25% sulfur, by weight of the charge, after which the rate of increase falls off. It will be noted further that the percentage elimination of arsenic is well below that of germanium but that the former rapidly approaches the latter with added sulfur in amounts above about 25%, by weight of the charge. On the other hand as shown in curve "C," zinc elimination is high with amounts of sulfur up to about 15%, by weight of the charge, and thereafter percentage elimination decreases sharply as the added sulfur is increased to about 35%, by weight of the charge.

What is claimed is:

1. A process for recovering germanium values from a copper-bearing material which comprises completely melting said material in the presence therein of sulfur to smelt said material and form therefrom a molten pool comprising a layer of molten matte containing germanium values, the amount of sulfur present in said material being in the range of about 5% less to about 10% more by weight of the charge than the minimum amount of sulfur required to form a molten pool which is free of molten metal and spiess layers, thereafter maintaining the thus formed pool in a molten state to volatilize a fume containing germanium values from said pool, whereby separation of copper value from the germanium values in said copper-bearing material is effected, and recovering germanium values from said evolved fume.

2. A process for effecting a partial separation of germanium values from zinc values contained in a copper-bearing material which comprises completely melting said material in the presence therein of sulfur to smelt said material and form therefrom a molten pool comprising a layer of molten matte containing germanium and zinc values, the amount of sulfur present in said material being in the range of about 5% less to about 10% more, by weight of the charge, than the minimum amount of sulfur required to form a molten pool which is free of molten metal and speiss layers, thereafter maintaining the thus formed pool in a molten state to volatilize a fume containing germanium values from said pool, whereby separation of copper values and partial separation of zinc values from the germanium values in said copper-bearing material is effected, and recovering germanium values from said evolved fume.

3. A process for effecting a partial separation of germanium values from arsenic values contained in a copper-bearing material which comprises completely melting said material in the presence therein of sulfur to smelt said material and form therefrom a molten pool comprising a layer of molten matte containing germanium and arsenic values, the amount of sulfur present in said material being in the range of about 5% less, by weight of the charge, than the minimum amount of sulfur required to form a molten pool which is free of molten metal and speiss layers up to about said minimum amount of sulfur, thereafter maintaining the thus formed pool in a molten state to volatilize a fume containing germanium values from said pool, whereby separation of copper values and partial separation of arsenic values from the germanium values in said copper-bearing material is effected, and recovering germanium values from said evolved fume.

4. A process for effecting a partial separation of germanium values from arsenic and zinc values contained in a copper-bearing material obtained by galvanic precipitation from an impure zinc electrolyte which comprises mixing elemental sulfur with said material, completely melting the mixture to smelt said material and form a molten pool comprising a layer of molten matte containing germanium, arsenic and zinc values, the amount of sulfur mixed with said material being in the range of about 5%, by weight of the charge, less than the minimum amount of sulfur required to form a molten pool which is free of molten metal and speiss layers up to about said minium amount of sulfur, thereafter maintaining the thus formed pool in the molten state to volatilize germanium values from the pool in a fume, whereby separation of copper values and partial separation of arsenic and zinc values from the germanium values in said material is effected, sweeping the pool with a stream of air to remove the evolved fume from the zone of the pool, burning the evolved fume in a burning zone, and filtering germanium oxide from the products of combustion.

References Cited in the file of this patent

UNITED STATES PATENTS

| | | |
|---|---|---|
| 1,660,150 | Cobb | Feb. 21, 1928 |
| 2,719,081 | Allen et al. | Sept. 27, 1955 |

FOREIGN PATENTS

| | | |
|---|---|---|
| 378,017 | Great Britain | July 22, 1932 |

OTHER REFERENCES

Thompson et al.: "Germanium, Produced as a Byproduct . . .," Journal of Metals, vol. 4, November 1952, pages 1132 to 1137.